(12) United States Patent
Liu

(10) Patent No.: US 12,434,343 B2
(45) Date of Patent: Oct. 7, 2025

(54) CALIBRATION-BASED TOOL CONDITION MONITORING SYSTEM FOR REPETITIVE MACHINING OPERATIONS

(71) Applicant: Rui Liu, Pittsford, NY (US)

(72) Inventor: Rui Liu, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 180 days.

(21) Appl. No.: 17/291,783

(22) PCT Filed: Nov. 6, 2019

(86) PCT No.: PCT/US2019/060076
§ 371 (c)(1),
(2) Date: May 6, 2021

(87) PCT Pub. No.: WO2020/097208
PCT Pub. Date: May 14, 2020

(65) Prior Publication Data
US 2022/0009049 A1    Jan. 13, 2022

Related U.S. Application Data

(60) Provisional application No. 62/756,125, filed on Nov. 6, 2018.

(51) Int. Cl.
*B23Q 17/09* (2006.01)
*G05B 19/4065* (2006.01)

(52) U.S. Cl.
CPC ..... *B23Q 17/0961* (2013.01); *B23Q 17/0995* (2013.01); *G05B 19/4065* (2013.01);
(Continued)

(58) Field of Classification Search
CPC ............ B23Q 17/0961; B23Q 17/0995; B23Q 17/0952; G05B 19/4065;
(Continued)

(56) References Cited

U.S. PATENT DOCUMENTS

| 3,793,627 A | 2/1974 | Darrel et al. |
| 4,176,396 A | 11/1979 | Howatt |

(Continued)

FOREIGN PATENT DOCUMENTS

| CN | 1352586 | 6/2002 |
| CN | 103324139 | 9/2013 |

(Continued)

OTHER PUBLICATIONS

Antic et al., "A Model of Tool Wear Monitoring System for Turning," Technical Gazette 2:247-53 (2013).
(Continued)

*Primary Examiner* — Tameem D Siddiquee
(74) *Attorney, Agent, or Firm* — Bond Schoeneck & King, PLLC; Joseph M. Noto

(57) ABSTRACT

A real-time calibration-based tool condition monitoring system, device and method for repetitive machining operations to monitor tool conditions by a combination of a calibration procedure using a reference tool and similarity analysis comparing the reference tool with a working tool is disclosed.

15 Claims, 8 Drawing Sheets

(52) U.S. Cl.
CPC ............. *G05B 2219/37233* (2013.01); *G05B 2219/37252* (2013.01); *G05B 2219/37256* (2013.01)

(58) Field of Classification Search
CPC ........... G05B 2219/37233; G05B 2219/37252; G05B 2219/37256; G01N 3/58
See application file for complete search history.

(56) References Cited

U.S. PATENT DOCUMENTS

| | | | |
|---|---|---|---|
| 4,295,301 | A | 10/1981 | Barth et al. |
| 4,442,494 | A | 4/1984 | Fromson et al. |
| 4,559,600 | A | 12/1985 | Rao |
| 4,620,281 | A | 10/1986 | Thompson et al. |
| 4,636,780 | A | 1/1987 | Thomas et al. |
| 4,658,245 | A | 4/1987 | Dye et al. |
| 4,694,686 | A | 9/1987 | Fildes et al. |
| 4,724,524 | A | 2/1988 | Thomas et al. |
| 4,736,625 | A | 4/1988 | Patterson et al. |
| 4,738,139 | A | 4/1988 | Blessing et al. |
| 4,757,307 | A | 7/1988 | Keramati et al. |
| 4,802,274 | A | 2/1989 | Petrof et al. |
| 4,806,914 | A | 2/1989 | Thomas et al. |
| 4,831,365 | A | 5/1989 | Thomas et al. |
| 5,059,905 | A | 10/1991 | Drits |
| 5,070,655 | A | 12/1991 | Aggarwal |
| 5,251,144 | A | 10/1993 | Krishnamoorthy |
| 5,266,929 | A | 11/1993 | Carmichael et al. |
| 5,319,357 | A | 6/1994 | Diei et al. |
| 5,587,931 | A | 12/1996 | Jones et al. |
| 5,904,457 | A | 5/1999 | Suwijn et al. |
| 5,940,787 | A | 8/1999 | Gelston |
| 6,161,055 | A | 12/2000 | Pryor |
| 6,308,138 | B1 | 10/2001 | Jones et al. |
| 6,604,013 | B1 | 8/2003 | Hamidieh et al. |
| 7,444,265 | B2 | 10/2008 | Havela et al. |
| 2002/0017139 | A1 | 2/2002 | Kluft et al. |
| 2003/0182014 | A1 | 9/2003 | McDonnell et al. |
| 2007/0016325 | A1* | 1/2007 | Esterling ............ G05B 19/4065 700/175 |
| 2007/0198219 | A1 | 8/2007 | Havela et al. |
| 2008/0161959 | A1 | 7/2008 | Jerard et al. |
| 2009/0240366 | A1* | 9/2009 | Kaushal ................. G06N 20/00 700/110 |
| 2010/0132528 | A1 | 6/2010 | Schaffner et al. |
| 2013/0211573 | A1 | 8/2013 | Wang et al. |
| 2013/0253670 | A1 | 9/2013 | Chung et al. |
| 2014/0216170 | A1 | 8/2014 | Ma et al. |
| 2016/0091393 | A1* | 3/2016 | Liao ...................... G01M 13/00 702/34 |
| 2019/0162704 | A1* | 5/2019 | Cheng .................... G01N 29/14 |

FOREIGN PATENT DOCUMENTS

| | | |
|---|---|---|
| CN | 203245680 | 10/2013 |
| CN | 103465107 | 12/2013 |
| CN | 105058165 | 11/2015 |
| CN | 105234746 | 1/2016 |
| CN | 105834835 | 8/2016 |
| CN | 102091972 | 12/2020 |
| DE | 3627796 | 10/1987 |
| DE | 4218799 | 6/1992 |
| GB | 2133881 | 6/1986 |
| GB | 2164775 | 7/1987 |
| GB | 2200747 | 10/1990 |
| RU | 2370750 | 7/2008 |
| WO | WO2000016036 | 3/2000 |

OTHER PUBLICATIONS

Moriwaki et al., "A New Approach to Automatic Detection of Life of Coated Tool Detection of Life of Coated Tool Based on Acoustic Emission Measurement," Journal of Engineering for Industry 112:212-8 (1990).

Diei et al., "Acoustic Emission Sensing of Tool Wear in Face Milling," Journal of Engineering for Industry 109:234-10 (1987).

Sun et al., "Multiclassification of Tool Wear with Support Vector Machine by Manufacturing Loss Consideration," Department of Mechanical Engineering 44:1179-87 (2004).

Haber et al., "An Investigation of Tool-Wear Monitoring in a High-Speed Machining Process," Sensors and Actuators, 539-45 (2004).

Alonso et al., "Application of Singular Spectrum Analysis to Tool Wear Detection Using Sound Signals," Journal of Engineering Manufacture 219:703-10 (2005).

Shi et al., "Tool Wear Predictive Model Based On Least Squares Support Vector Machines,"Mechanical Systems and Signal Processing 1799-1814 (2007).

Deio et al.,, "Use of Audio Signals For Chatter Detection And Control," Journal of Engineering for Industry 114:146-57 (1992).

Binsaeid et al., "Machine Ensemble Approach for Simultaneous Detection Of Transient And Gradual Abnormalities In End Milling Using Multisensory Fusion," Journal of Materials Processing Technology 209:4728-38 (2009).

Cho et al., "Tool Breakage Detection Using Support Vector Machine Learning in A Milling Process," International Journal of Machine Tools & Manufacture 45:241-9 (2005).

Diniz et al., "Correlating Tool Life, Tool Wear and Surface Roughness By Monitoring AcousticEmission In Finish Turning," Wear 152:395-407 (1992).

Cus et al., "Real-Time Cutting Tool Condition Monitoring in Milling," Journal of Mechanical Engineering 57:142-50 (2011).

Fu et al., "Intelligent Tool Condition Monitoring in Milling Operation," Southampton Institute (UK) Systems Engineering Faculty 1-10 (1998).

Hase et al., "The Relationship Between Acoustic Emission Signals and Cutting Phenomena inTurning Process," The International Journal of Advanced Manufacturing Technology 70:947-955.

Hsueh et al., "Tool Breakage Diagnosis in Face Milling By Support Vector Machine," Journal of Materials Processing Technology 209:145-52(2009).

Jemielniak, "Some Aspects of AE Application In Tool Condition Monitoring," Ultrasonics 38:604-608 (2000).

Kilundu et al., "Tool Wear Monitoring by Machine Learning Techniques And Singular Spectrum Analysis," Mechanical Systems and Signal Processing 25:400-15 (2011).

Lee et al., "In-Process Tool Condition Monitoring Systems in CNC Turning Operations,"Retrospective Theses and Dissertations 1-178 (2006).

Lela, "Regression Analysis, Support Vector Machines, And Bayesian Neural Network Approaches to Modeling Surface Roughness in Face Milling, " The International Journal of Advanced Manufacturing Technology 1-7 (2009).

Rafezi et al, "Time Domain and Frequency Spectrum Analysis of Sound Signal for Drill Wear Detection," International Journal of Computer and Electrical Engineering 4(5):722-5 (2012).

Raja et al., "Emitted Sound Analysis for Tool Flank Wear Monitoring using Hilbert Huang Transform," International Journal of Computer and Electrical Engineering 4(2):110-14 (2012).

Lu et al., "Analysis of Sound Signal Generation Due to Flank Wear in Turning," Journal of Manufacturing Science and Engineering 124:799-808 (2002).

Rubio et al., "Process Monitoring Systems for Machining Using Audible Sound Energy Sensors," Future Manufacturing Systems 1-20 (2010).

Mannan et al., "Application of Image and Sound Analysis Techniques to Monitor the Condition of Cutting Tools," Pattern Recognition Letters 21:969-979 (2000).

Madusudana et al., "Face Milling Tool Condition Monitoring Using Sound Signal," International Journal of Systems Assurance and Engineering 1-11 (2017).

Huo et al., "On-Line Tool Condition Detection Based on Acoustic Signal," International Journal of Applied Science and Technology 202-7 (2014).

(56) References Cited

OTHER PUBLICATIONS

Ghosh et al., "Estimation of tool wear during CNC milling using neural network-based sensorfusion," Mechanical Systems and Signal Processing 466-79 (2007).
Weller et al., "What Sound Can Be Expected from a Worn Tool?," Journal of Engineering for Industry 525-34 (1969).
Sadat et al., "Detection of Tool Flank Wear Using Acoustic Signature Analysis," Wear 115:265-72 (1987).
Raja et al., "Tool Flank Wear Condition Monitoring during Turning Process by SVD Analysis on Emitted Sound Signal," European Journal of Scientific Research 49(4)503-9 (2011).
Lin et al., "Life Prediction System Using a Tool's Geometric Shape for High-Speed Milling," The International Journal of Advanced Manufacturing Technology 30:622-30 (2006).
Aliustaoglu et al., "Tool Wear Condition Monitoring Using a Sensor Fusion Model Based on Fuzzy Inference System," Mechanical Systems and Signal Processing 23:539-546 (2009).
Joseph et al., "Emitted Sound Amplitude Analysis Using Hilbert Huang Transformation for Cutting Tool Flank Wear Prediction," 269:743-52 (2012).
Trabelsi et al., "Pattern-Recognition Analysis of Sound Radiation in Metal Cutting," TheInternational Journal of Advanced Manufacturing Technology 6:220-31 (1991).
Tin-Hong et al., "Study of Sound Signal for Tool Wear Monitoring System in Micro-MillingProcesses," ASME International Manufacturing Science and Engineering Conference (2009).
Quancheng Dong et al., "The Study of Tool Wear and Breakage Based on the Characteristic Analysis of Acoustic Spectrum," Materials Science Forum, Advances in Materials Manufacturing Science and Technology II 532-533:197-200 (2006).
AJ et al., "The Milling Tool Wear Monitoring Using the Acoustic Spectrum," The InternationalJournal of Advanced Manufacturing Technology 61:457-463 (2012).
Zhang et al., "A New Tool Wear Estimation Method Based on Shape Mapping in the Milling Process," The International Journal of Advanced Manufacturing Technology 53:121-30 (2011).
Wang et al., "Force Sensor Based Tool Condition Monitoring Using a Heterogeneous Ensemble Learning Model," Sensors 14:21588-602 (2014).
Tobon-Mejia et al., "CNC Machine Tool's Wear Diagnostic and Prognostic by Using DynamicBayesian Networks," Elsevier, 28:167-82 (2012).
Sundaram et al., "Study of Flank Wear in Single Point Cutting Tool Using Acoustic Emission Sensor Techniques," 3(4):32-6 (2008).
Segreto et al., "Principal Component Analysis for Feature Extraction And NN Pattern Recognition in Sensor Monitoring of Chip Form During Turning," CIRP Journal of Manufacturing Science and Technology, 7(3)202-9 (2014).
Fikri et al., "Online Monitoring Cutting Tool Wear Using Audio Signal," AIP Conference Proceedings 1778:030066 (2016).
Ming et al., "Effects of Cutting Parameters on Tool Insert Wear in End Milling of Titanium Alloy Ti6Al4V," Chinese Journal of Mechanical Engineering 30(1):53-9 (2016).
Lamraoui et al., "Indicators for Monitoring Chatter in Milling Based on Instantaneous Angular Speeds," Mechanical Systems and Signal Processing 44:72-85 (2014).
Nouri et al., Real-Time Tool Wear Monitoring in Milling Using a Cutting Condition Independent Method, Author's Accepted Manuscript, 1-38 (2014).
Li et al., "An In-Depth Study of Tool Wear Monitoring Technique Based on Image Segmentation And Texture Analysis," Measurement 79:44-52 (2016).
Rmili et al., "An Automatic System Based on Vibratory Analysis for Cutting Tool Wear Monitoring," Measurement 77:117-23 (2016).
Zhu et al., "The Monitoring of Micro Milling Tool Wear Conditions by Wear Area Estimation,"Mechanical Systems and Signal Processing 93:80-91 (2017).
Stavropoulos et al., "Tool Wear Predictability Estimation in Milling Based on Multi-SensorialData," The International Journal of Advanced Manufacturing Technology 82:509-521 (2016).
Zhang et al., "Tool Condition Monitoring and Remaining Useful Life Prognostic Based on a Wireless Sensor in Dry Milling Operations," Sensors 16(795):1-20 (2016).
Jemielniak et al., "Tool Condition Monitoring Based on Numerous Signal Features," The International Journal of Advanced Manufacturing Technology 59:73-81 (2012).
Khorasani et al., "Tool Life Prediction in Face Milling Machining of 7075 Al by Using Artificial Neural Networks (ANN) and Taguchi Design of Experiment (DOE)," International Journal ofEngineering and Technology 31(1):30-6 (2011).
Cho et al., "Design of Multi Sensor Fusion-Based Tool Condition Monitoring System in End Milling," The International Journal of Advanced Manufacturing Technology 681-694 (2010).
Ren et al., "Type-2 Fuzzy Tool Condition Monitoring System Based On Acoustic Emission InMicro Milling," Information Sciences 255(10):121-34 (2014).
Elijah et al., "Monitoring Tool Wear Using Classifier Fusion," Mechanical Systems and Signal Processing 85(15)651-61(2017).
Wang et al., "Multisensory Fusion Based Virtual Tool Wear Sensing for Ubiquitous Manufacturing," 45:47-58 (2017).
Bhuiyan et al., "Application of Acoustic Emission Sensor to Investigate the Frequency of Tool Wear and Plastic Deformation in Tool Condition Monitoring," Measurement 92:208-17 (2016).
Wang et al., "Force Sensor Based Online Tool Wear Monitoring Using Distributed Gaussian ARTMAP Network," Sensors and Actuators A: Physical 192: 111-118 (2013).
Zhang et al., "Novel Tool Wear Monitoring Method in Ultra-Precision Raster Milling Using CuttingChips," Precision Engineering 38:(3)555-60 (2014).
Sadilek et al., "Cutting Tool Wear Monitoring with the Use of Impedance Layers," 21(3):639-644 (2014).
Cao et al., "Chatter Identification in End Milling Process Based on EEMD And Nonlinear Dimensionless Indicators," International Journal of Machine Tools & Manufacture 92:52-9 (2015).
Zhu et al., "Online Condition Monitoring in Micro milling: A Force Waveform Shape Analysis Approach," IEEE Transactions on Industrial Electronics 62(6):3806-13 (2015).
Painuli et al., "Tool Condition Monitoring Using K-Star Algorithm," Expert Systems with Applications 41:2638-43 (2014).
Cerce et al., "A New Approach to Spatial Tool Wear Analysis and Monitoring, " Journal of Mechanical Engineering 61(9):489-97 (2015).
Ahmad et al., "Development of Tool Wear Machining Monitoring Using Novel Statistical Analysis Method, I-kaz," Procedia Engineering 101:355-62 (2015).
Jahromi et al., "Application of Clustering Methods for Online Tool Condition Monitoring and Fault Diagnosis in High-Speed Milling Processes," IEEE Systems Journal 1-12 (2016).
Drouillet et al., "Tool Life Predictions in Milling Using Spindle Power with the Neural Network Technique," Journal of Manufacturing Processes 22:161-8 (2016).
Wang et al., "Enhanced Particle Filter for Tool Wear Prediction," Journal of Manufacturing Systems 36:35-45 (2015).
Niaki et al., "Stochastic Tool Wear Assessment in Milling Difficult to Machine Alloys,"International Journal of Mechatronics and Manufacturing Systems 8(3/4):134-59 (2015).
Wang et al., "Tool Wear Monitoring of Wiper Inserts in Multi-Insert Face Milling Using Three-Dimensional Surface Form Indicators," 137:031006-1-031006-8 (2015).
Huang et al., "A PNN Self-Learning Tool Breakage Detection System in End Milling Operations," Applied Soft Computing 37:114-124 (2015).
Axinte et al., "Assessment of the Effectiveness of a Spindle Power Signal for Tool Condition Monitoring in Machining Processes," International Journal of Production Research 42(13):2679-91 (2004).
Kim et al., "Indirect Cutting Force Measurement in Multi-Axis Simultaneous NC MillingProcesses," International Journal of Machine Tools and Manufacture 39:1717-31 (1999).
Altintas et al., "In-Process Detection of Tool Failure In Milling Using Cutting Force Models," Journal of Engineering for Industry 111:149-57 (1989).
Kim et al., "Milling Cutter Wear Monitoring Using Spindle Shaft Vibration," 119:118-9 (1997).

(56) References Cited

OTHER PUBLICATIONS

Sampath et al., "Tool Health Monitoring Using Acoustic Emission," International Journal of Production Research 25(5):703-19 (1987).
Lee et al., "Real-Time Tool Breakage Monitoring for NC Milling Process," CIRP Annals-Manufacturing Technology 44(1)59-62 (1995).
Yan et al., "A Multi-Sensor Strategy for Tool Failure Detection In Milling, " International Journal ofMachine Tools and Manufacture 35(3)383-9 (1995).
Matsubara et al., "Monitoring and Control of Cutting Forces in Machining Processes: A Review," International Journal of Machine Tools and Manufacture 3(4):445-56 (1995).
Principe et al., "A New Algorithm for The Detection of Tool Breakage in Milling," International Journal of Machine Tools and Manufacture, 31(4)443-54 (1991).
Wang et al., "Feature-Filtered Fuzzy Clustering for Condition Monitoring of Tool Wear," Journal ofIntelligent Manufacturing 7:13-22 (1996).
Sikdar et al., "Relationship Between Tool Flank Wear Area and Component Forces in Single Point Turning," Journal of Materials Processing Technology 128:210-5 (2002).
Elangovan et al., "Studies on Bayes Classifier For Condition Monitoring of Single Point Carbide Tipped Tool Based on Statistical and Histogram Features," 37: 2059-65 (2010).
Marinescu et al., "A Critical Analysis of Effectiveness of Acoustic Emission Signals to Detect Tool and Workpiece Malfunctions in Milling Operations," International Journal of Machine Tools and Manufacture, 48:1148-60 (2008).
Hutton et al., "Acoustic Emission Monitoring of Tool Wear in End-Milling Using Time-DomainAveraging," Journal of manufacturing science and engineering, 121:8-12 (1999).
Ryabov et al., "An In-Process Direct Monitoring Method for Milling Tool Failures Using a Laser Sensor," CIRP annals, 45(1)97-100 (1996).
Wong et al., "Tool Condition Monitoring Using Laser Scatter Pattern," Journal of Materials Processing Technology 63:205-10 (1997).
Nidal et al., "Analytical Model for Tool Wear Monitoring in Turning Operations Using Ultrasound Waves," International Journal of Machine Tools and Manufacture 40:1619-35 (2000).
Scheffer et al., "An Industrial Tool Wear Monitoring System for Interrupted Turning," Mechanical Systems and Signal Processing 18:1219-42 (2004).
Don et al., "Bayesian-Inference-Based Neural Networks for Tool Wear Estimation," The International Journal of Advanced Manufacturing Technology, 30:797-807 (2006).
Suprock et al., Directionally Independent Failure Prediction of End-Milling Tools During Pocketing Maneuvers, ASME International Conference on Manufacturing Science and Engineering (2006).
Xiaoli et al., "On-Line Detection of the Breakage Of Small Diameter Drills Using Current Signature Wavelet Transform1," International Journal of Machine Tools and Manufacture 39:157-64 (1999).
Ramirez-Nunez et al., "Smart-Sensor for Tool-Breakage Detection In Milling Process Under Dry And Wet Conditions Based On Infrared Thermography," The International Journal of Advanced Manufacturing Technology, 97:1753-65 (2018).
Jeon et al., "Knife-Edge Interferometry (KEI) for Cutting Tool Wear Monitoring," Precision Engineering, 50:10.1016 (2017).
Zhu et al., "Online Tool Wear Monitoring Via Hidden Semi-Markov Model with DependentDurations," IEEE Transactions on Industrial Informatics 14(1):1-10 (2018).
Zhang et al., "A Multi-State Diagnosis and Prognosis Framework with Feature Learning for Tool Condition Monitoring," ArXiv (2018).
Rizal et al., "Cutting Tool Wear Classification and Detection Using Multi-Sensor Signals And Mahalanobis-Taguchi System," Wear, 376-77:1759-65 (2017).
D'Addona et al., "Tool-Wear Prediction and Pattern-Recognition Using Artificial Neural Network and DNA-Based Computing," Journal of Intelligent Manufacturing 28:1285-1301 (2017).
Klocke et al., "Model-Based Online Tool Monitoring for Hobbing Processes," Procedia CIRP, 58:601-6 (2017).
Yu et al., "Tool Condition Prognostics Using Logistic Regression with Penalization and ManifoldRegularization," Applied Soft Computing 64:454-67 (2018).
Zhimeng et al., "Milling Tool Wear State Recognition Based on Partitioning Around Medoids (PAM) Clustering," The International Journal of Advanced Manufacturing Technology 88:1203-13 (2017).
Babouri et al., "Prediction of Tool Wear in the Turning Process Using the Spectral Center ofGravity," Journal of Failure Analysis and Prevention 17:905-13 (2017).
Akbari et al., "A Method Based on Spindle Motor Current Harmonic Distortion Measurements for Tool Wear Monitoring," 39:5049-5055 (2017).

* cited by examiner

CALIBRATION-BASED TOOL CONDITION MONITORING SYSTEM FOR REPETITIVE MACHINING OPERATIONS

CROSS REFERENCE

This application claims the benefit of the filing date of U.S. Provisional Patent Application Ser. No. 62/756,125, filed Nov. 6, 2018, which is hereby incorporated by reference in its entirety.

FIELD

The present disclosure relates to a system, device and method for tool condition monitoring, and in particular for tool condition monitoring in a repetitive machining process causing tool degradation.

BACKGROUND

Since the industrial revolution, machining operations have been found to be the core field of the manufacturing industry. There has been a significant level of evolution in technology applied for metal cutting processes on the basis of core objectives to obtain improved production efficiency, higher machining accuracy, and reduced machine downtime with less maintenance costs. Machining automation is one of the primary technology advancements that have assisted in achieving high production efficiency to meet the current demand of high-precision production in huge quantities. Although many research works contribute significantly to achieve overall efficiency, the tool condition monitoring system is still in need to achieve reduced machine downtime and tooling costs. The effective system should be capable of monitoring the machining process in real-time to adapt the ongoing cutting process to avoid catastrophic failures, simplify maintenance procedures, and make full use of the tool life.

Now-a-days, the integration of sensors and computing power to the machines has led to the development of sophisticated condition monitoring systems for manufacturing systems to deliver intelligence capabilities of predictive maintenance strategies. Furthermore, the increasing use of digital technologies in current age of industrial revolution 'Industry 4.0' has benefitted these monitoring systems with robust sensing, monitoring, and control capabilities. Although a lot of research has been conducted in developing condition monitoring systems with the increasingly available digital technologies, many of these systems are found to be not practical for implementation in shop-floors. This is mainly due to the lack of good understanding in capabilities and limitations of the actual manufacturing environments to develop the methodologies and technologies of these monitoring systems, especially for small and medium sized manufacturing enterprises which mainly focus on implementing affordable monitoring systems with very minor modifications of their existing manufacturing procedures and machines.

The first step in developing an affordable condition monitoring system with more practical solutions for machining applications is to understand and simplify the research problem of condition monitoring based on the commonly followed industry practices of machining process design. Typically, the machining processes performed in industrial scenarios are pre-programmed into robust computer numerical control (CNC) machines to perform cutting operations under very broad cutting conditions and various operation environments, and more and more types of cutting tools and workpiece materials are available to be selected based on specific applications of parts. Thus, the effective tool condition monitoring system requires large flexibility and adaptability to perform monitoring under the above stated machining conditions. In addition, these application scenarios require a simple solution which can be employed with ease and low cost rather than high accuracy. Furthermore, we also need to realize that, even though there exist large variations in machining operations, most of typical mass productions require repeatability in the process to increase the productivity and reduce setup time. Unfortunately, this characteristic hasn't been utilized by research studies to simplify the monitoring process.

For any types of machining processes, the cutting tool is the critical component that largely decides the machining quality and efficiency. Typically, the cutting tool life degrades mainly due to several tool wear mechanisms which gradually lead to the tool failure. In general, tool life can be estimated through a controlled set of trial tests, and the cutting tool needs to be replaced when it achieves the estimated tool life by monitoring the machining time or the quantity of machined parts. Most of the tool life estimations are very conservative thereby result in the early replacement even though the tool still can cut properly. On the other hand, the cutting tools still can fail prematurely due to quality defects of tools or extreme cutting conditions. Unexpected tool failures can result in serious damage, scrapped parts, and excessive machine downtime. Therefore, tool condition monitoring is very necessary to monitor the progression of tool conditions and predict the remaining tool life to replace the tool beforehand to avoid a catastrophic failure.

Many research works have been conducted in the past four decades to develop tool condition monitoring systems for various machining processes. Typical monitoring systems involve mainly two critical modules, hardware and software.

The hardware module of the system mainly refers to the sensory system which measures various process variables influenced by cutting tool conditions in the machining process. Typically, sensory systems can be categorized into direct and in-direct methods based on their measurement approaches. Direct methods are very limited to machining applications due to the inaccessibility of the cutting zone, whereas indirect methods are more flexible to be employed in industrial scenarios by measuring the indirect process variables such as cutting force, vibration, acoustic emission, sound, temperature, and power consumption. There have been various studies in applications of indirect sensory methods independently or multi-sensor fusion approaches to monitor cutting tool conditions. Even though these various indirect sensory approaches have their own merits, their practical applications are limited by the complexity of their setups and data acquisition systems. Thus, the development of an effective monitoring system relies on application of simple and compact monitoring methodologies with affordable sensing approaches and monitoring systems that can be applicable for modern machines with pre-fitted sensors.

The software module of the system is composed of signal processing and cognitive decision-making stages. The signal processing stage is responsible for generating features from the acquired sensory signals that provide the information related to the cutting tool conditions. The traditional techniques employed for this stage process sensory signals in the time domain, the frequency-domain or the time-frequency domain. The features generated from the signal processing stage are fed as inputs to the cognitive decision-making stage. Regarding the decision-making stage, many prior research works in this field have performed various studies to identify appropriate features and specify thresholds corresponding to various tool conditions. Recently, with the evolution of computing technology, artificial intelligence techniques have been employed as major decision-making algorithms in tool condition monitoring, which are based on identifying pattern logic in obtained information through features.

Even though various new sensors and more advanced computing technologies have been continuously introduced by different studies to improve the performance of developed tool condition monitoring systems, there is still a long way to go to apply the systems under development to real applications. The computing technologies proposed by those previous studies are mainly limited by the requirement of huge machining process data with intensive training procedures which further results in a process-specific monitoring model. In addition, the intricacy in designing of those models is further complicated by the increased variability within the machining process for complex part designs. Furthermore, the deployment of these complex monitoring models requires high performance computing and communication infrastructure which incurs huge costs for the establishment of these advanced intelligent manufacturing systems or modification of existing manufacturing systems, especially for small and medium sized machining enterprises.

Based on the various limitations observed from the monitoring models of previous studies, it is well recognized that the major challenge comes from the comprehensive requirements of high accuracy, real-time monitoring, affordable technology, and good adaptability for the effective monitoring system. Among these requirements, the real-time capability has been overemphasized by prior studies. Considering the complex toolpaths with variable cutting conditions in actual productions, most of the prior works followed the similar research methodology to operate cutting tests under different cutting conditions to generate signals by prepared cutting tools with specific conditions, and the signals were collected and processed to extract features which can reflect the progression of tool conditions under various cutting conditions to realize the real-time monitoring. However, this approach requires very complex analyses and strongly relies on the machine and the machining environment employed to operate the experiments, which largely restrict the wide application of developed system. Actually, considering the complexity of the machining process, the adaptability of the monitoring system receives more attention from industrial manufacturers in actual productions, instead of the accuracy and the real-time capability. Furthermore, this adaptability characteristic of a monitoring system can be achieved by integrating the process knowledge of actual machining process design followed in shop-floors into the development of methodology for a tool condition monitoring system.

SUMMARY

In accordance with one aspect of the present invention, there is provided a method for real-time tool condition monitoring, including:
calibrating a machine system including a machine, tool, workpiece and monitoring device including a sensory system and control software, by
a) installing at least one reference tool in the machine to operate on the workpiece,
b) operating repetitive machining operations on the workpiece with the at least one reference tool under production conditions,
c) collecting signals generated by the sensory system while monitoring the at least one reference tool, and
d) processing the collected signals with control software to provide reference signals corresponding to specific conditions of the at least one reference tool;
following calibration, operating repetitive machining operations on the workpiece with a working tool under production conditions;
collecting signals generated by the sensory system from monitoring tool conditions of the working tool;
processing the collected signals with control software to provide working signals corresponding to specific conditions of the working tool; and
analyzing by the control software performing a similarity analysis between the reference signals and the working signals to identify the status of the working tool condition.

In accordance with another aspect of the present disclosure, there is provided a tool condition monitoring system including:
a workpiece;
a working tool;
a machine which performs a repetitive process on the workpiece with the working tool, whereby the working tool degrades;
at least one reference tool; and
a monitoring device including a sensory system including at least one sensor which collects reference signals during repetitive operations in calibration and working signals during repetitive operations in production, and control software which processes the reference signals and the working signals and operates a similarity analysis between the reference signals and the working signals to identify the status of the working tool condition during repetitive operations in production.

In accordance with another aspect of the present disclosure, there is provided a real-time tool condition monitoring device including a sensory system having at least one sensor which collects signals during repetitive operations in both calibration and production, and control software which processes reference signals and working signals and operates a similarity analysis between the reference signals and the working signals to identify the status of at least one working tool condition.

In accordance with another aspect of the present disclosure, the present system provides a very practical and flexible solution to monitor the cutting tool conditions, which can be applied in actual production. There is provided the calibration procedure into the tool condition monitoring system to accommodate the system to different machines, workpiece materials, toolpaths, and machining environments. If any of those conditions change, the present monitoring system can be re-calibrated with an efficient calibration procedure before use. In addition, the present method is compatible with various types of sensory methods to collect signals for tool condition monitoring and has no restrictions to install the sensors in specific locations of the machine. To be consistent the same sensor system is used in both calibration and actual production.

In accordance with another feature of the present disclosure, there is provided a method for comparing the signals with their features generated by the reference cutting tools in calibration and the working cutting tools in operation, the similarity analysis used by the present system can help to identify the most probable tool failure mechanism or the progression of specific tool failure mechanism between adjacent levels. The similarity analysis could be very easy to apply compared with other decision-making algorithms, which has better compatibility with different control systems.

In accordance with another feature of the present disclosure, there is provided an independent system to be installed on various machines to monitor the tool conditions and cutting processes. The system could be used as one subsystem together with other subsystems to be installed on various machines to monitor the tool conditions and cutting processes or used as one component of cyber-manufacturing systems to collect data for machine health prognostics, fleet-based asset management, and manufacturing reconfigurability.

These and other aspects of the present disclosure will become apparent upon a review of the following detailed description and the claims appended thereto.

DETAILED DESCRIPTION

Figure 1:
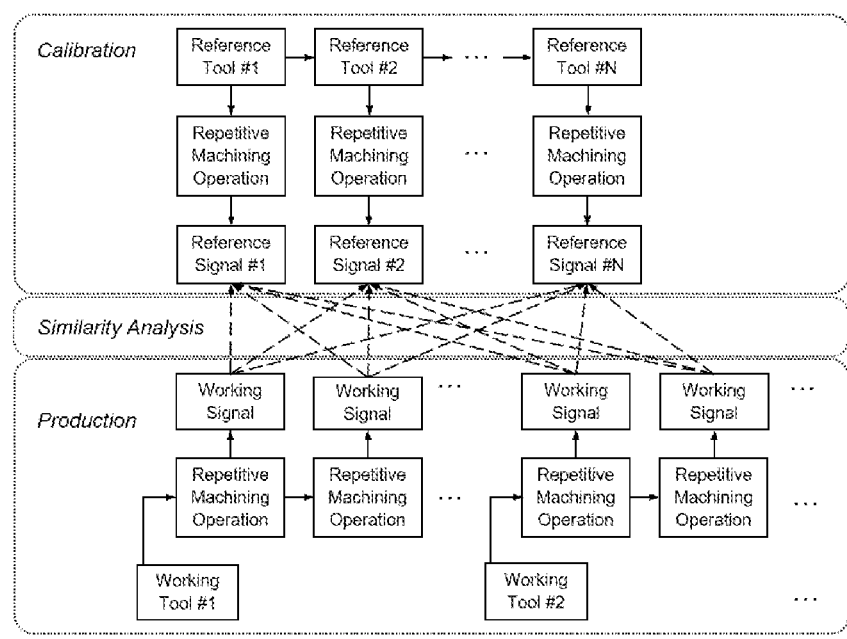
FIG. 1 is a method for tool condition monitoring, in accordance with present the procedure.

This disclosure provides a straight-forward and flexible solution to monitor tool conditions, which can be applied to various machines, tools, workpiece materials, and complex toolpaths with a competitive manner. Disclosed is a calibration-based tool condition monitoring system, device and method for repetitive machining operations to monitor tool conditions by a combination of a calibration procedure and similarity analysis in real-time.

In an embodiment, a tool condition monitoring system, includes: a workpiece; a working tool; a machine which performs a repetitive process on the workpiece with the working tool, whereby the working tool degrades; at least one reference tool which degrades when the machine performs a repetitive process on the workpiece with the reference tool during a calibration procedure; and a monitoring device including a sensory system having at least one sensor which collects reference signals from reference tool conditions during repetitive operations in calibration and working signals from working tool conditions during repetitive operations in production, and control software which processes the reference signals and the working signals and operates a similarity analysis between the reference signals and the working signals to identify the status of the working tool condition during repetitive operations in production.

Machines refer to, but are not limited to, a broaching machine, dill press, gear shaper, hobbing machine, hone, lathe, milling machine, saw, grinding machine, or the like.

In accordance with an embodiment, a tool removes material from the workpiece. The tool includes various types of cutting tools that are installed on various machines to remove material from the workpiece, which could be single-point or multipoint tools made of different types of materials, such as high speed steel, cemented carbides, ceramics and sintered oxides, diamond, and cubic boron nitride, or coated by different types of coatings. A suitable tool includes a turning tool, milling tool, drilling tool, hobbing tool, shaping tool, grinding tool, polishing tool, or the like. In an embodiment, a tool is referred to as a reference tool when used to calibrate the system and a working tool when used in a calibrated system.

Workpiece materials refer to various types of materials to be machined, including metals, polymers, ceramics, and composites.

The present tool condition monitoring system monitors various tool conditions. Tool conditions refer to various tool failure mechanisms which include, but are not limited to, flank wear, crater wear, notch wear, plastic deformation, thermal cracks, edge chipping, coating loss, tool breakage, and the like. Tool conditions also refer to the progression of specific tool failure mechanisms in terms of different levels. Each level can be considered as a separate tool condition. A single tool can have different levels of tool conditions. The tool should be replaced at or before reaching the limiting tool condition which is the maximum permissible tool failure level and determined by the recommended values from the handbooks or vendors, operator's experiences, or the quality requirements of the products.

The present system can be used for monitoring tool conditions in competitive machining operations, which are the most common machining operations in actual productions. Such repetitive operations make the calibration procedure and the similarity analysis feasible to learn the tool conditions from the repeating patterns of working signals. The competitive machining operation could be the entire toolpath to make the identical part repetitively. The competitive machining operation also could be the portion of the entire toolpath in a repetitive manner, e.g., the slot cut in gear milling. Each competitive machining operation cannot be too long to change the tool condition from one to another within one operation. The present system can be employed under both dry and wet tool conditions.

One or more reference tools can be prepared to possess the specific tool conditions for monitoring during the calibration procedure. The reference tools are preferably the same type as the working tools used in actual production. The reference tools possess the specific tool conditions to be monitored in actual production. The reference tools can be prepared in either actual repetitive production or other machining processes, and the specific tool conditions can be identified by either operator's experience or actual measurements. In an embodiment, a working tool can be used as the reference tool during the calibration procedure.

In an embodiment, the monitoring device includes a sensory system and control software.

The sensory system can be installed on the actual machine to collect signals for both calibration and actual production. The sensory system has one sensor or multiple same sensors or multiple different sensors to collect signals which include, but are not limited to, cutting force, torque, acoustic emission, vibration, audible sound, surface roughness, temperature, displacement, spindle power, current, or the like. The sensory system also includes suitable electronic components to connect the sensors to the control software to filter and amplify the collected signals.

The control software of the present system is used to process the collected signals during the calibration procedure and the actual production and operate the similarity analysis for decision-making. In an embodiment, the control software includes an A/D converter to convert the signals into digital form. The control software can include optional digital preprocessing procedures to further filter and amplify the digital signals. The control software includes a feature extraction procedure to generate various features from digital signals in time, frequency, or time-frequency domains. The control software includes a similarity analysis model to measure the similarities between the working signals and reference signals by calculating pairwise distances, which could be the Euclidean distance, the Manhattan distance, and the cosine distance, in terms of the variance standard deviation or the correlation coefficient, etc. Advanced digital signal processing methods including, but are not limited to cross-correlation, windowed-fast Fourier transform spectral comparison, spectral coherence correlation, matched filtering, and beam formation, can help to operate the signal similarity analysis.

Based on the signal similarity analysis, the most similar reference signals with respect to specific cutting tool condition or adjacent two levels of specific cutting tool condition can be identified. The corresponding condition of the working cutting tool can be determined in terms of specific tool condition or the progression of specific tool condition between adjacent two levels.

In accordance with an embodiment, a method for tool condition monitoring, includes:
calibrating a machine system including a machine, tool, workpiece and monitoring device including a sensory system and control software, by
a) installing at least one reference tool in the machine to operate on the workpiece,
b) operating repetitive machining operations on the workpiece with the at least one reference tool under production conditions,
c) collecting signals generated by the sensory system while monitoring the at least one reference tool, and
d) processing the collected signals with control software to provide reference signals corresponding to specific tool conditions of the at least one reference tool;
following calibration, operating repetitive machining operations on the workpiece with a working tool under production conditions;
collecting signals generated by the sensory system from monitoring tool conditions of the working tool;
processing the collected signals with control software to provide working signals corresponding to specific conditions of the working tool; and
analyzing by the control software performing a similarity analysis between the reference signals and the working signals to identify the status of the working tool condition.

The workpiece can be one or more of the same workpiece, e.g., the workpiece can be changed during or after the calibration, and during the production. The method optionally includes replacing the working tool with a second working tool when the working tool condition reaches a limiting tool condition, such as pre-failure.

In accordance with an embodiment, a method for tool condition monitoring, as shown in FIG. 1, includes the following process steps:
a) selecting or preparing at least one reference cutting tool possessing a specific tool condition to be monitored;
b) installing the reference cutting tool #1 on the specific machine for actual production;
c) completing one actual repetitive machining operation on an actual workpiece with the reference cutting tool #1;
d) collecting at least one reference signal by the sensory system while operating the repetitive machining operation using the reference cutting tool #1;
e) repeating the steps b) to d) for each reference cutting tool to collect at least one reference signal according to a calibration procedure;
f) installing a working tool #1 on the specific machine for actual production;
g) completing one actual repetitive machining operation on the actual workpiece with the working tool #1;
h) collecting at least one working signal by the sensory system while operating the repetitive machining operation using the working tool #1;
i) processing and analyzing the collected working signals in steps d) and h) by the control software to operate a similarity analysis between the reference signals and the monitored working signals in actual production to identify the tool condition of the working tool #1;
j) repeating the steps f) to i) for another repetitive machining operation until reaching the limiting cutting tool condition;
k) replacing the working tool #1 by a new working tool #2; and optionally
l) repeating the steps f) to k) until finishing the entire production.

Figure 2:
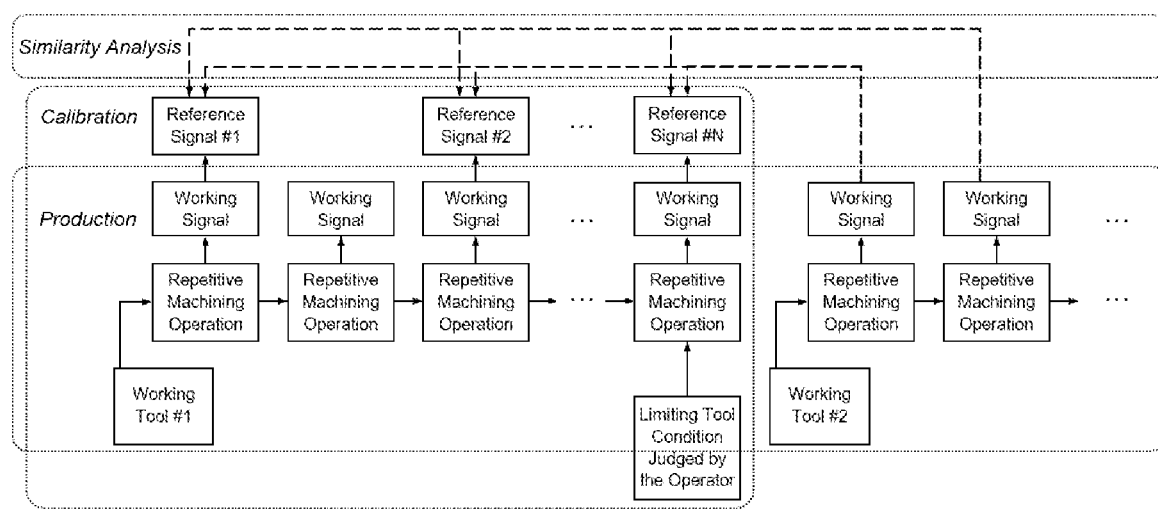
FIG. 2 is a method for tool condition monitoring, in accordance with present the procedure.

In accordance with an embodiment, a method for tool condition monitoring, as shown in FIG. 2, includes the following process steps:
a) installing a working tool #1 for actual production on the specific machine for actual production;
b) completing one actual repetitive machining operation on an actual workpiece with the working tool #1;
c) collecting at least one reference signal by the sensory system while operating the repetitive machining operation using the working tool #1;
d) repeating the steps b) and c) until reaching a limiting cutting tool condition, which is decided by the operator's experience or measurements;
e) collecting additional reference signals from the step c) as reference signals to finish the calibration procedure;
f) installing a new working tool #2 for actual production on the specific machine for actual production;
g) completing one actual repetitive machining operation on an actual workpiece with the working tool #2;
h) collecting at least one working signal by the sensory system while operating the repetitive machining operation using the working tool #2;
i) processing and analyzing the collected working signals in steps c) and h) by the control software to operate a similarity analysis between the reference signals generated by the working tool #1 and the monitored working signals generated by the working tool #2 to identify the tool condition of the working tool #2;
j) repeating the steps g) to i) for another repetitive machining operation until reaching the limiting cutting tool condition determined in the step d);
k) replacing the working tool #2 by a new working tool #3; and optionally
l) repeating the steps f) to k) until finishing the entire production.

The disclosure will be further illustrated with reference to the following specific examples. It is understood that these examples are given by way of illustration and are not meant to limit the disclosure or the claims to follow.

Example 1

Figure 3A:
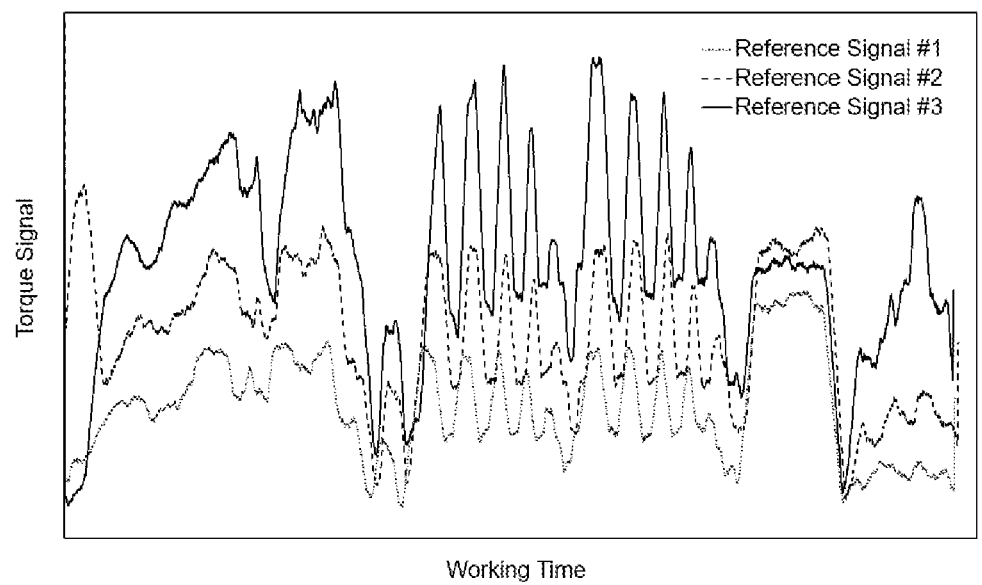
FIG. 3A is a graph of reference signals generated by reference cutting tools and FIG. 3B is a graph comparing working signals with reference signals for different tool conditions, in accordance with present the procedure.
Figure 3B:
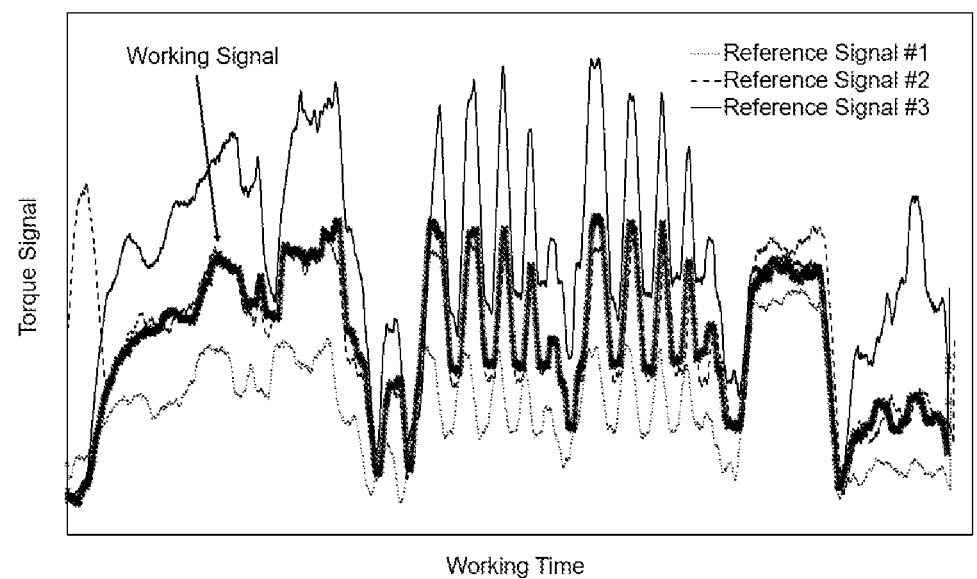

FIG. 3A shows exemplary reference signals generated by reference cutting tools with different tool conditions in accordance with present calibration procedure during a repetitive machining operation. By comparing the working signals generated by a working tool in actual repetitive production with the reference signals for different tool conditions, as shown in FIG. 3B, it can be realized that the working tool condition is most similar to the tool condition corresponding to the reference signal #2, and a more accurate decision can be made by the signal similarity analysis.

Example 2

Figure 4:
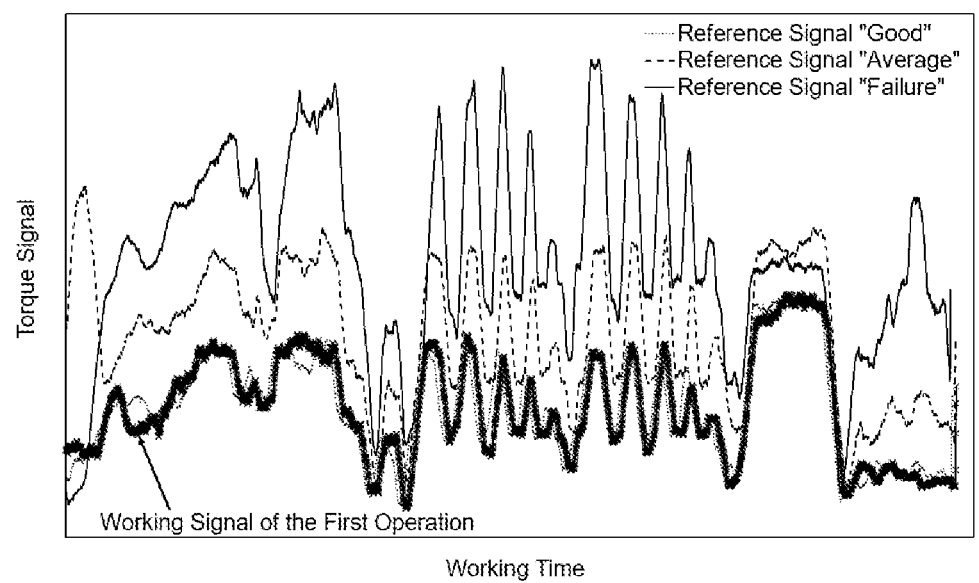
FIG. 4 shows both reference and working signals smoothened and trimmed.

In this example, a batch of triangular rotors of Wankel rotary engine having a square base are produced by repetitive milling operations. The workpiece material used to make this part is 1018 steel, and the cutting tool chosen for this study is uncoated high-speed steel four-flute end mill. The wet machining operations are carried out under the conventional side-milling configuration on a vertical CNC milling center. The torque sensor installed on the spindle is used to acquire spindle torque signals. In this work, three reference tools with different conditions are chosen based on experiences and labeled as "Good", "Average", and "Failure". The chosen reference tools are used to operate the repetitive machining operation, and the spindle torque signals are collected as reference signals for the three different tool conditions. In actual production, the same cutting tool replaces the reference tool to operate the same repetitive machining operation, and the spindle torque signal is collected. After each operation, both reference and working signals are smoothened and trimmed as shown in FIG. 4.

For the similarity analysis, the time series data of reference and working signals are represented as g(i) and h(i) where i denotes the index of the data point of a total n data points of both the signals. The reference signal h(i) with shorter signal length after trimming is compared with the target signal g(i) at each shift point to calculate the discrepancy error value of the signal discrepancy function $f(k)$. The total number of shift points k is identified by calculation the difference in signal length between reference and target signals which the difference is denoted as l, where k ranges from 0 to l. The $f(k)_{min}$ is considered as the final signal discrepancy value as the shift parameter, k, which denotes the maximum alignment with lowest discrepancy between the comparing signals.

$$f(k) = \frac{1}{n}\sum_{i=0}^{n}\left|\frac{h(i) - g(i+k)}{h(i)}\right|$$

The signal similarity parameter is calculated based on the following equation.

Signal Similarity Parameter (%)=$100 \times e^{-f(k)_{min}}$

Figure 5:
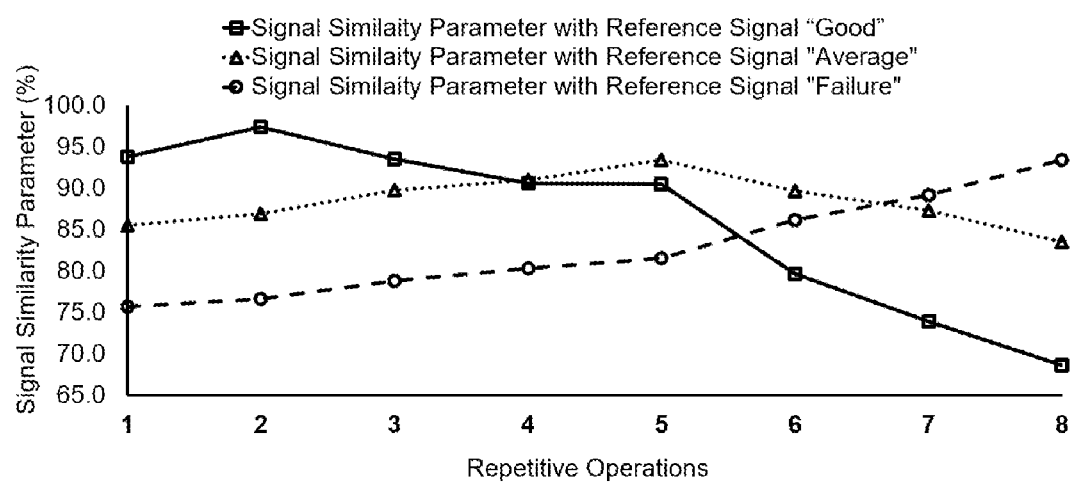
FIG. 5 shows similarity parameters between working signals and reference signals.

As shown in FIG. 5, the similarity parameters between the working signals and reference signals can be estimated based on the above similarity analysis after each repetitive operation until reaching the highest similarity parameter with the "Failure" reference signal. The similarity analysis has shown that the working signal has the highest similarity with the "Good" reference signal in the first three operations, and then the "Average" reference signal in the following several operations, and finally the "Failure" reference signal in the last few operations, which agrees with the development trend of the tool failure.

Example 3

Figure 6:
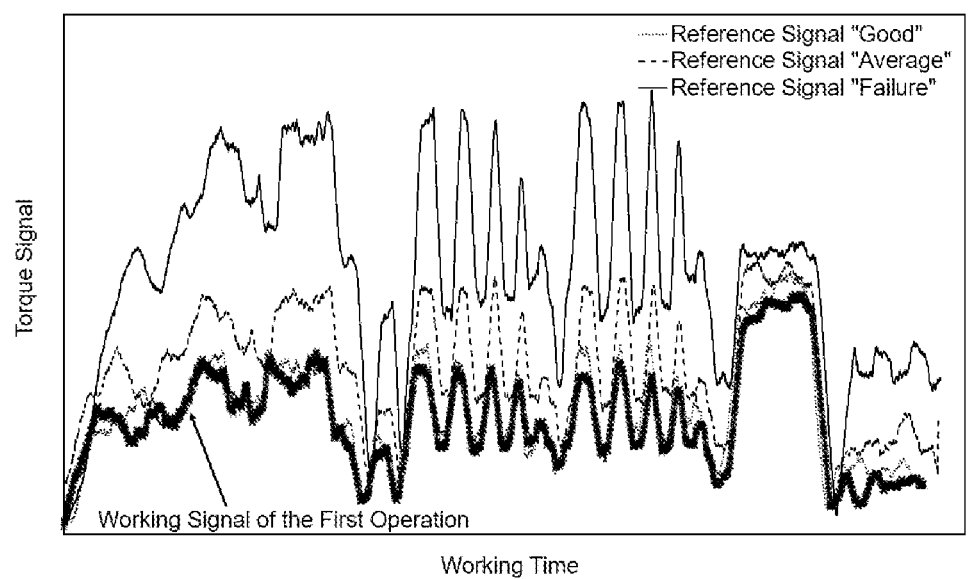
FIG. 6 shows both reference and working signals smoothened and trimmed.

In this example, the same parts are produced by the same repetitive milling operations as described in Example 2. In this work, a new cutting tool is used to operate the repetitive operations until reaching the limiting cutting tool condition decided by the operator's experience, and the generated torque signal for each repetitive operation is collected. The signals, from the first operation, the last operation, and the operation in between, are selected as reference signals for the following similarity analysis and labeled as "Good", "Average", and "Failure". Next, another new cutting tool is used to operate the same repetitive machining operation, and the torque signal is collected as the working signal. After each operation, both reference and working signals are smoothened and trimmed as shown in FIG. 6.

Figure 7:
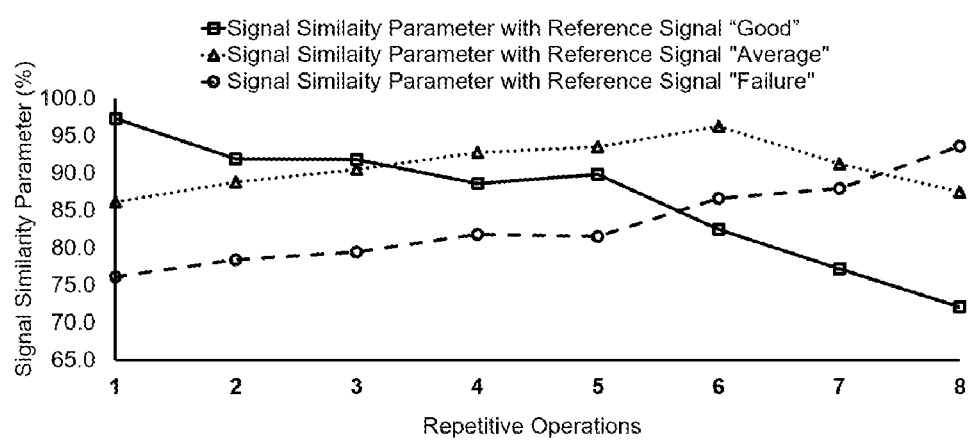
FIG. 7 shows a similarity analysis.

Based on the similarity analysis explained in Example 2, the similarity parameters between the working signal and reference signals can be estimated after each repetitive operation until reaching the highest similarity parameter with the "Failure" reference signal. The similarity analysis, as shown in FIG. 7, has demonstrated that the working signal has the highest similarity with the "Good" reference signal in the first three operations, and then the "Average" reference signal in the following several operations, and finally the "Failure" reference signal in the last few operations, which agrees with the development trend of the tool failure.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method for tool condition monitoring, comprising:
calibrating reference signals for different tool conditions for a machine system comprising a machine, tool, workpiece and monitoring device comprising a sensory system and control software, by
installing a first reference tool in the machine to operate on a first workpiece,
operating a repetitive machining operation on the first workpiece with the first reference tool under production conditions, whereby the first reference tool degrades,
collecting at least one reference signal relating to a condition of the first reference tool generated by the sensory system while monitoring the first reference tool,
installing a second reference tool in the machine to operate on a second workpiece,
operating the repetitive machining operation on the second workpiece with the second reference tool under production conditions, whereby the second reference tool degrades,
collecting at least one reference signal relating to the condition of the second reference tool generated by the sensory system while monitoring the second reference tool, and
processing the collected at least one reference signals with control software to provide reference signals corresponding to specific reference tool conditions according to a calibration procedure;

following the calibration of the reference signals for specific tool conditions, operating the repetitive machining operation on a third workpiece with a working tool under production conditions, whereby the working tool degrades;

collecting at least one working signal relating to the condition of the working tool generated by the sensory system from monitoring tool conditions of the working tool; and processing and analyzing the collected at least one working signal with control software to provide a similarity analysis between the reference signals and the working signals to identify in real-time a status of the working tool condition.

2. The method of claim 1, wherein the status of the working tool condition comprises flank wear, crater wear, notch wear, plastic deformation, thermal cracks, edge chipping, coating loss, or tool breakage.

3. The method of claim 1, wherein the status of the working tool condition comprises a progression of different levels of a specific tool failure mechanism.

4. The method of claim 1, wherein the working tool removes material from the workpiece.

5. The method of claim 4, wherein the working tool comprises a turning tool, milling tool, drilling tool, hobbing tool, shaping tool, grinding tool, or polishing tool.

6. The method of claim 1, wherein the reference tool comprises at least one specific tool condition to be monitored.

7. The method of claim 1, wherein the reference tool comprises a working tool used as the reference tool in the calibration procedure.

8. The method of claim 1, further comprising replacing the working tool with a second working tool when the working tool condition reaches a limiting tool condition.

9. A tool condition monitoring system, comprising:
a workpiece;
a working tool;
a machine which performs a repetitive process on the workpiece with the working tool, whereby the working tool degrades;
and
a monitoring device comprising a sensory system comprising at least one sensor which collects reference signals from multiple reference tools each operating on a different reference workpiece during repetitive operations in calibration of the collected reference signals corresponding to different reference tool conditions and collects working signals during repetitive operations of the working tool in production, and control software which processes the calibrated reference signals and the collected working signals and operates a similarity analysis between the calibrated reference signals and the collected working signals to identify in real-time a status of the working tool condition during repetitive operations in production.

10. The system of claim 9, wherein the status of the working tool condition comprises flank wear, crater wear, notch wear, plastic deformation, thermal cracks, edge chipping, coating loss, or tool breakage.

11. The system of claim 9, wherein the status of the working tool condition comprises a progression of different levels of a specific tool failure mechanism.

12. The system of claim 9, wherein the working tool removes material from the workpiece.

13. The system of claim 12, wherein the working tool comprises a turning tool, milling tool, drilling tool, hobbing tool, shaping tool, grinding tool, or polishing tool.

14. The system of claim 9, wherein the reference tool comprises at least one specific tool condition.

15. The system of claim 9, wherein the reference tool comprises a working tool.

* * * * *